I. HENTON.

Wheel-Cultivator.

No. 52,998. Patented Mar. 6, 1866.

Witnesses
Arthur Hall,
C. A. Jackett

Inventor
Isaiah Henton

UNITED STATES PATENT OFFICE.

ISAIAH HENTON, OF SHELBYVILLE, ILLINOIS.

IMPROVEMENT IN CULTIVATORS.

Specification forming part of Letters Patent No. 52,998, dated March 6, 1866.

*To all whom it may concern:*

Be it known that I, ISAIAH HENTON, of Shelbyville, in the county of Shelby and State of Illinois, have invented a new and useful Improvement in Cultivators; and I do hereby declare the following to be a full, clear, and exact description of the same when taken in connection with the drawings herewith, which are made part of my specification.

My invention relates to what are called "two-row" cultivators, and to implements provided with a seat upon which the driver rides; and my improvement consists in the construction and arrangement of the frame-work of the implement, by which the operation is conveniently controlled by the driver, as hereinafter described.

Figure 1:
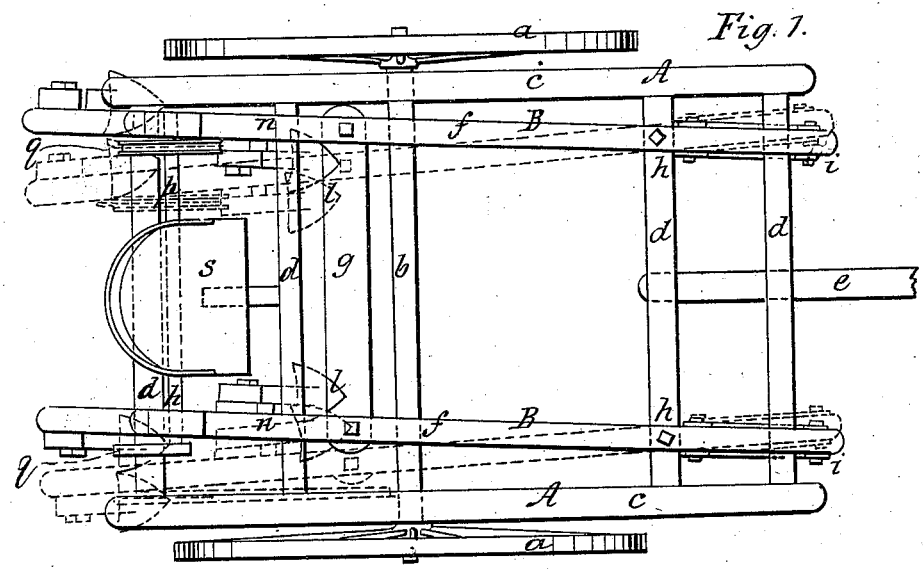
Figure 2:
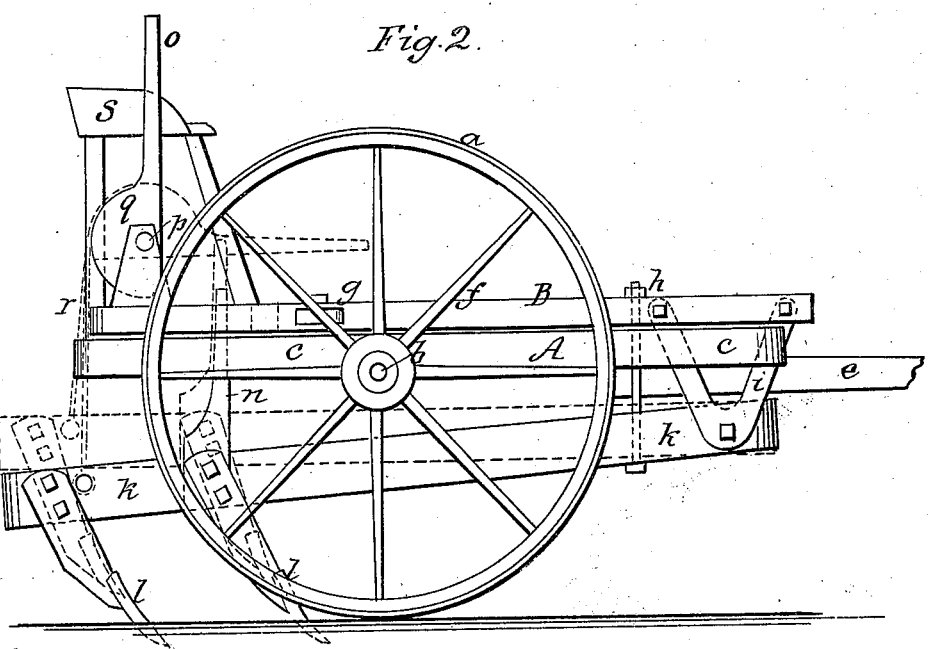

In the accompanying drawings, Figure 1 is a plan view of the implement. Fig. 2 represents a side elevation.

Like letters of reference used in this description are applied to and indicate corresponding parts in the different drawings.

A represents the frame of the carriage, consisting of wheels $a$, axle $b$, side pieces, $c$, cross-pieces $d$, and tongue $e$. The side pieces, cross-pieces, and tongue are all framed together rigidly and secured to the axle of the implement, forming a complete carriage.

B represents a separate frame, by which the cultivator-teeth are carried. This consists of side pieces, $f$, and cross-pieces $g$, the latter entering loosely into mortises in the side pieces, so as to permit the frame to vibrate freely from side to side for a short distance. The frame B is above and rests fairly on frame A, being also pivoted to cross-piece $a$ of the latter at points indicated by $h\ h$. From the forward ends of side pieces, $f$, hangers $i\ i$ descend, and to these the beams $k\ k$, which carry the cultivator-teeth $l\ l$, are pivoted. To the after or free end of these beams cultivator-teeth are appropriately secured, and from near the after ends of the beams standards $n$ rise and rest against the inner faces of the side pieces, $f$, of frame B.

$o$ is a hand-lever upon a shaft, $p$, which also carries two sheaves, $q$, from each of which a cord or chain, $r$, descends to the after or free end of the beams $f$. $s$ is the driver's seat.

The arrangement of the parts which has been specified is such that the driver, when occupying the seat $s$, may place one of his feet against each of the side pieces, $f$, of the frame B, and with a slight effort is enabled to vibrate the after or free end of the frame in either direction, carrying with it the after or free end of the cultivator-beams, the latter being controlled by the fastenings and the standards $n$ to move in either direction simultaneously with the frame B. The teeth of the cultivator may thereby be controlled to work the ground very close to the rows, and to avoid plants which may be growing a short distance out from the rows, also to avoid or pass around slight obstructions.

In passing to and from the field when the teeth of the implement are not required to be working the ground, or in case of any obstruction requiring the teeth to be raised above the ground, the driver by operating the hand-lever $o$, can elevate the after or free end of beams $k$, thereby raising the teeth from the ground, rendering them for the time inoperative.

Having now fully described my improvement in cultivators, what I claim as my invention, and desire to secure by Letters Patent of the United States, is the following:

The combination and arrangement of the carriage-frame A, the vibrating frame B, pivoted to A, the beams $k$, hangers $i$, standards $n$, and the hand-lever $o$ with the sheaves $q$ and cords or chains $r$, substantially as herein specified, and for the purpose described.

ISAIAH HENTON.

Witnesses:
ANTHY. HALL,
C. A. TACKETT.